April 20, 1965   R. N. JANEWAY   3,179,439
TRAILER SUSPENSION
Filed Aug. 15, 1961   3 Sheets-Sheet 3

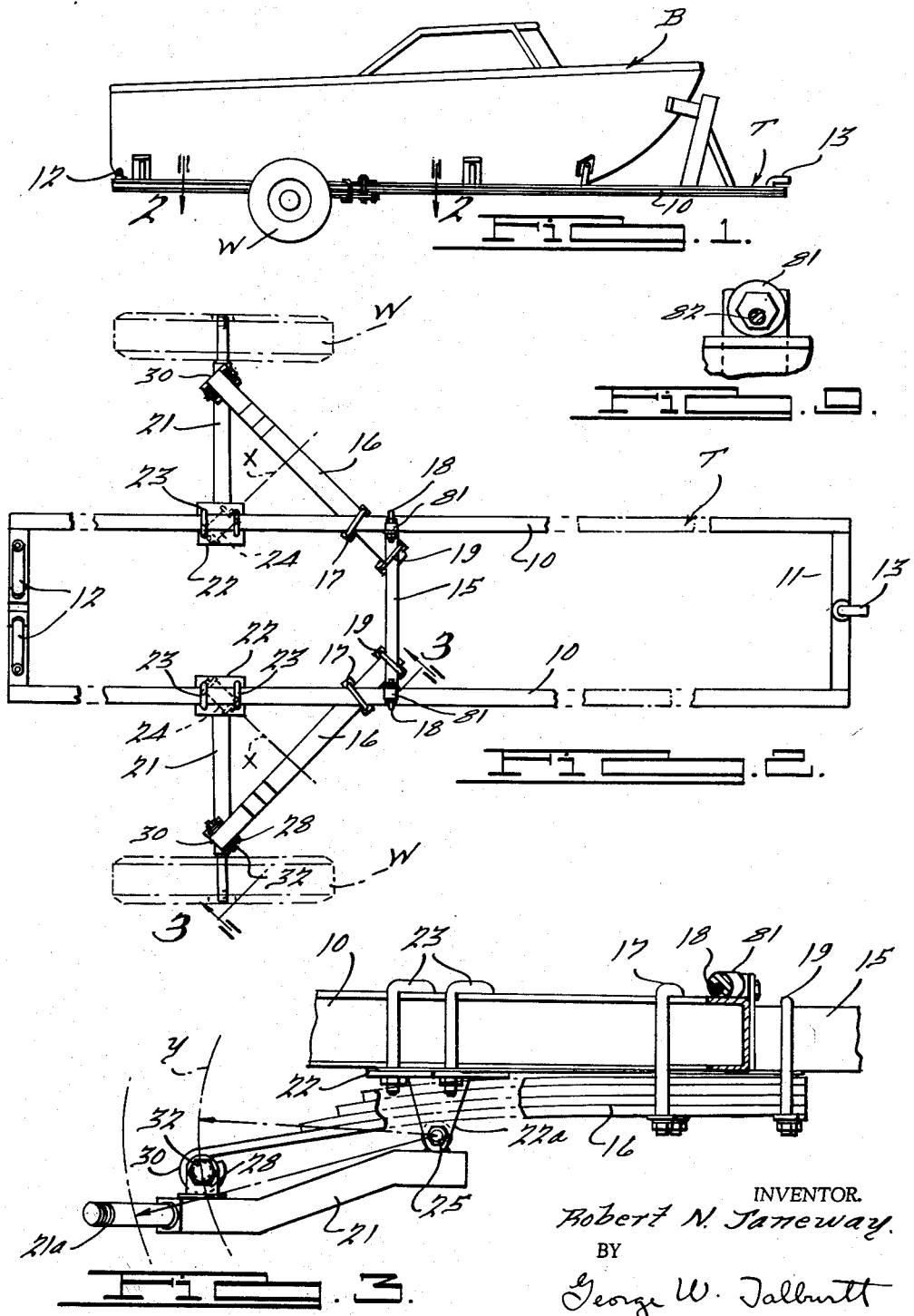

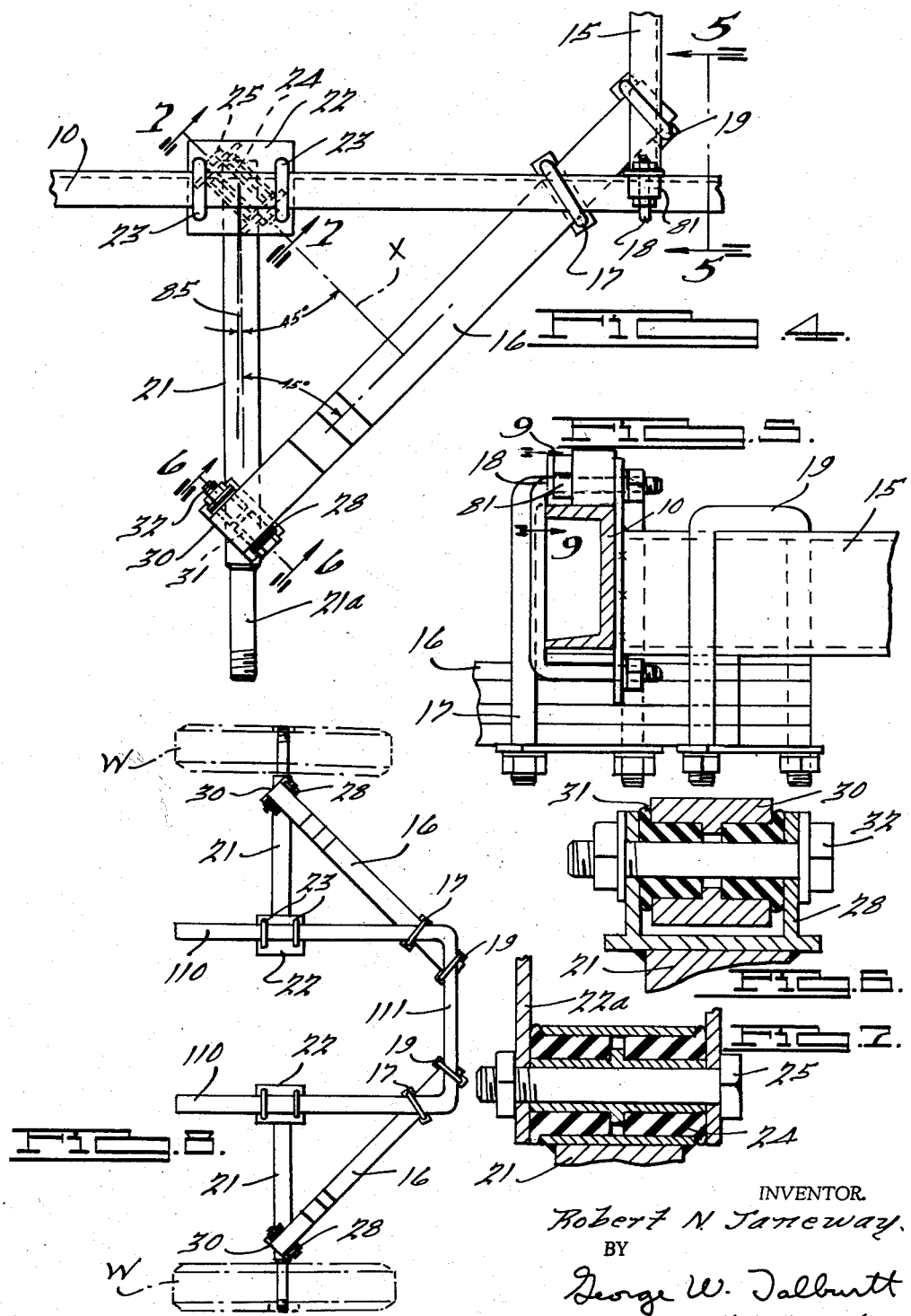

INVENTOR.
Robert N. Janeway
BY
George W. Talbutt
ATTORNEY

United States Patent Office 3,179,439
Patented Apr. 20, 1965

3,179,439
TRAILER SUSPENSION
Robert N. Janeway, 8120 E. Jefferson, Detroit, Mich.
Filed Aug. 15, 1961, Ser. No. 131,630
8 Claims. (Cl. 280—124)

This invention relates to a vehicle suspension and particularly to a suspension designed for boat trailers.

It is a primary object of this invention to provide an efficient trailer suspension at minimum cost that uses a minimum of rugged, service-free components.

Secondly, it is another object of this invention to eliminate the conventional trailer solid axle and the associated structural members outboard of the main frame that are required to carry the load to the suspension springs.

It is another object of this invention to greatly reduce the unsprung weight of a trailer suspension by eliminating the conventional solid axle and to thereby minimize wheel hop.

It is another object to increase the clearance of the vehicle above the center of the roadway to permit the vehicle to pass over rugged roads or soft sand or mud.

It is still another object of this invention to greatly increase the roll stability of the trailer suspension by raising the roll axis as a result of the wheel swing arm geometry and by widening the effective spring spacing to equal the full tread width. This arrangement means that softer springing can be used to better protect the trailer load without obtaining excessive roll on curves. It is estimated that, with the same suspension deflection rate at the wheels, the roll stability of this suspension is approximately double that of the conventional solid axle trailer suspension.

It is still another object of this invention to arrange the suspension leaf springs in such a manner that they essentially have to deflect only vertically in accommodating changes in load or dynamic vertical wheel movements. In this way, I prevent the imposition of simultaneous torsional or lateral spring deflections which would otherwise result in higher spring stresses for a given vertical spring rate.

It is particularly an object to connect each wheel to the chassis by an articulated triangle which is movable up and down under load but which is substantially rigid in the fore and aft direction.

Other objects and advantages of this invention will become readily apparent from a consideration of the following description and the related drawings, wherein:

FIG. 1 is a side elevational view of a boat trailer embodying this invention;

FIG. 2 is an enlarged plan looking in the direction of the arrows 2—2 of FIG. 1 and showing the trailer suspension embodying this invention;

FIG. 3 is an enlarged fragmentary view partly in elevation and partly in section taken along the line and looking in the direction of the arrows 3—3 of FIG. 2;

FIG. 4 is an enlarged portion of the plan shown in FIG. 2;

FIG. 5 is an enlarged view partly in elevation and partly in section taken along the line and looking in the direction of the arrows 5—5 of FIG. 4;

FIG. 6 is an enlarged view partly in elevation and partly in section taken along the line and looking in the direction of the arrows 6—6 of FIG. 4;

FIG. 7 is an enlarged view partly in elevation and partly in section taken along the line and looking in the direction of the arrows 7—7 of FIG. 4;

FIG. 8 is a plan view of a modified form of this invention;

FIG. 9 is a view taken on the line 9—9 of FIG. 5;

Figure 10:
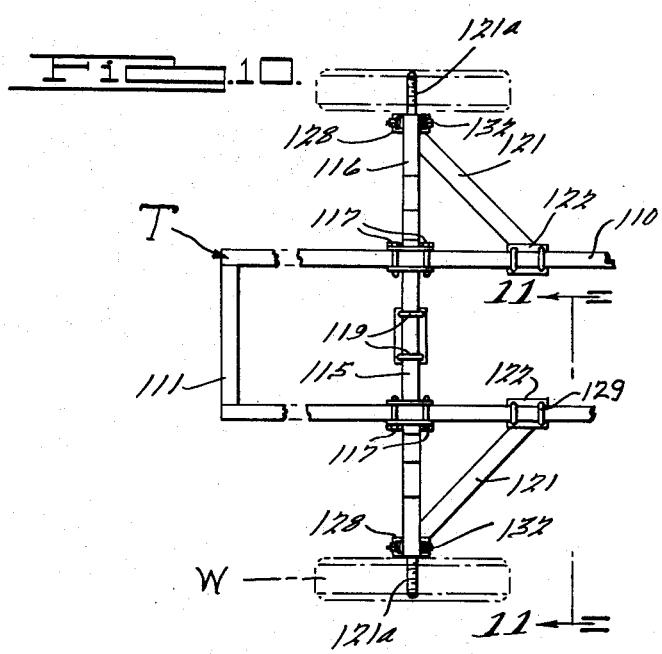
FIG. 10 is a top plan view of a modified form of this invention.

FIG. 1 of the drawings shows a two wheel trailer T that is designed particularly for the transportation of a boat B or like load. This trailer T comprises a pair of stiff longitudinally extending, transversely spaced, side frame rails 10 that are interconnected at their front and rear ends by cross members 11 and 12 respectively. Front cross member 11 includes a suitable trailer hitch connection 13 for attachment to a towing vehicle. In order to attach the trailer spring suspension elements to the trailer frame it is preferable to have an intermediate cross member 15 interconnecting the side frame members 10 which intermediate cross member 15 provides an anchor for the inboard ends of the cantilever leaf spring elements 16. The cross member may be an integral part of the side rails 10, 10 or it may be detachably connected thereto by shackles 18.

The spring elements 16 diverge outwardly from the side rail members 10, 10 and are connected to the side rail members 10, 10 by suitable U bolts 17. Although the springs 16 are shown mounted at an angle of about 45° for illustration, it will be understood that this angle may be varied within the scope of the claims, depending on the requirements of a specific design. The innermost ends of the spring elements 16 are connected to the cross frame member 15 by U bolts 19. This two point anchor mounting for the inboard ends of the leaf springs 16 provides a very rugged, rigid spring mounting.

Extending transversely of the side rail members 10, 10 and preferably perpendicular thereto at each side of the trailer are the pivoted wheel supporting arms 21. The arms 21 are each pivoted at their inner ends to a pivot pin support bracket 22 that is fixed to the adjacent side rail member 10 by suitable U bolts 23. The wheel supporting arm members 21 may be tubular members that each have a bar type wheel spindle portion 21a telescopically mounted in their outer end portions. Spindles 21a journal the trailer wheels W. The inner ends of the wheel supporting swing arms 21 each mount a resilient bushing 24 (see FIG. 7) which bushing extends horizontally at approximately a forty-five degree (45°) angle to the longitudinal axis of the arm 21 (see FIG. 4). A pivot pin 25 pivotally connects the swing arm bushing 24 to the depending ears 22a of the associated frame mounted bracket 22.

It will also be noted from FIG. 4 that the cantilever-type leaf springs 16 diverge outwardly from the two frame side rails 10, 10 at an angle of approximately forty-five degrees (45°). Thus the leaf springs 16 extend perpendicularly to the pivot axes X of the wheel supporting swing arms 21.

Mounted on the outer end portion of each of the wheel supporting swing arms 21 is a U-shaped spring eye bracket 28. Bracket 28 extends at an angle of approximately forty-five degrees (45°) to the longitudinal axis of the swing arm 21 so that it is substantially parallel to the pivot axis X of the swing arm pivot bushing 24 (see FIG. 7). The outwardly positioned free end of the leaf spring 16 is formed with an eye 30 that has mounted therein resilient bushings 31 (see FIG. 6). A pivot bolt 32 extends through the upstanding ears of the swing arm bracket 28 and through the bore in the resilient bushings 31 so as to pivotally connect the free end of the leaf spring 16 to the swing arm bracket 28.

Thus, this simplified form of two wheel trailer suspension consists essentially of three members, namely, a frame member, and a pivoted wheel supporting swing arm 21 and a cantilever leaf spring 16 both of which are supported inboard of the wheels W on the frame member. The wheel supporting arm bearing or pivot bushing 24 which defines the axis of rotation of the swing arm is mounted at an angle to the swing arm center line of approximately forty-five degrees (45°). The leaf spring 16 is mounted so that it deflects only in a plane perpendicular to the wheel arm swing axis. The spring eye 30 on the outer end of the spring 16 is pivoted to the bracket 28 on the outer end of the swing arm 21, the pivot axis being located parallel to the axis of swing arm rotation. The relationship of the spring mounting on frame to the swing arm pivot bracket 28 is fixed so that the spring eye path is approximated by a circular arc whose center is on the extended axis of rotation X of the swing arm 21 over the working range of spring deflection. Thus, the spring 16 acts as a rotating link to guide the free end of the wheel arm 21 positively about the designated swing axis X. The structure described includes an articulated or hinged triangular frame 10, 16, 21, two sides of which can move up and down. This triangle is substantially rigid in its own plane and hence in the fore and aft direction. The eye of the spring is pivoted directly to the swing arm with or without a resilient bushing. Thus, the spring acts as a strut to resist any fore and aft dynamic forces applied from the wheel. Such forces can be resolved into two components, one axial and the other transverse with respect to the spring. Leaf springs are well adapted to take such loads, being particularly rigid in lateral bending and providing some degree of shock absorption in the axial direction. The rubber bushings 24 and 31 in the swing arm pivot and the spring eye connections are desirable to avoid wear and to permit any slight departure from a true circular arc in the movement of the spring eye 30 about its axis X. As shown, the swing arm rotational axis X lies in a horizontal plane but obviously it could be inclined by suitable modification of its pivot pin boss and/or the bracket 22 or by modification of the clamping arrangement of the spring 16 to the frame members 10, 15. Also, the axis X can be reversed from that shown by directing it outwardly towards the rear of the vehicle rather than towards the front thereof. Thus, this suspension design is qiute flexible and can accommodate a wide range of suspension geometry to meet varied vehicle handling requirements.

The invention has the advantage over other suspensions of eliminating torsional and lateral deflecting in the springs, in accommodating vertical wheel movements at the same time permitting direct connection between springs and wheel arms. If the leaf springs 16 were to extend longitudinally at right angles to the wheel arms 21, the springs would have to deflect torsionally and laterally as well as vertically. This would be impractical from a standpoint of getting the required vertical deflection rate without excessive stresses in the springs. This situation would not be materially improved by inclining the wheel arm pivots to form an axis which intersects the clamped ends of the springs. Another advantage of the present arrangement is the ease with which the wheel suspension can be moved along the trailer by loosening the U-bolts 17, 18, 19, 23. This accommodates loads of different centers of gravity.

While FIGS. 1 through 7 of the drawings show the wheel arm bearing bracket 22, spring 16 and cross member 15 independent of each other and each clamped by brackets and U-bolts or shackles to the main trailer side rails 10, 10, still, it is evident that these several suspension parts could be made up as a complete subassembly by forming the cross frame member and a pair of short side rail members as an integral U-shaped sub-frame member on which the swing arms 21 and leaf springs 16 could be preassembled. FIG. 8 of the drawings shows such a separate suspension assembly wherein a one-piece U-shaped frame formed of side rails 110 and a connected cross rail portion 111 provide the supporting structure for the cantilever leaf springs 16 and the pivotally mounted swing arms 21, the brackets 22 being permanently attached to the rails 110. It is merely necessary to bolt the subassembly side rails 110 on to the trailer side rails 10, 10 by means of the U bolts 17 and 23. This subassembly unit shown in FIG. 8 has many advantages as it permits an accurate preassembly of the leaf springs 16 and the wheel supporting spring arms 21 with the subassembly being adapted for attachment to a trailer base frame at any particular location to meet the conditions of the particular load to be carried.

FIG. 9 shows one form of eccentric mounting at the anchored ends of the cantilever leaf springs 16 so that the angle of the springs 16 with respect to the horizontal may be readily adjusted to meet variation in the loadings and wheel suspension geometry. As seen best in FIGS. 2–5 the upper leg portions of the shackle bolts 18 of the cross member 15 each mount a cylindrical sleeve 81 with an eccentrically positioned bore 82 that receives the associated shackle leg. One end of the sleeve 81 is formed with a hexagonal wrench receiving portion to permit rotation of the sleeve on the shackle bolt leg portion. The rotational position of the sleeves 81 will determine the height of the cross member 15 that seats the inner ends of the cantilever leaf springs 16. Raising and lowering the cross rail 15 will thus change the angle of the spring 16 with respect to the horizontal.

While the sleeves 81 are shown as cylindrical with hexagonal wrench holds, it is also contemplated to make the adjusting sleeves 81 from hexagonal bar stock that has an ececntric bore therethrough. Such a shape would provide at least four separate adjustments that could readily be selected at any time. The flat sides of a hexagonal bar would provide excellent seats for the adjusting sleeves 81 on the rails 10.

FIG. 4 shows an angle designated by the reference numeral 85 which represents a one degree angle of swing arm preset that can be built into the suspension to correct for toe-in. This may not be necessary in all cases.

Figure 11:
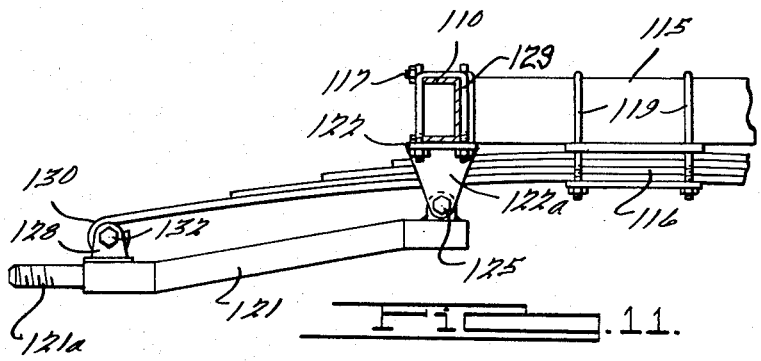
FIG. 11 is an enlarged view partly in elevation and partly in section taken along the line of and looking in the direction of the arrows 11—11 of FIG. 10.

FIGS. 10 and 11 show another modified form of this invention wherein the relationship of the swing arms 121 and the leaf spring element 116 in the wheel-supporting triangle are reversed with respect to the arrangement shown in the other figures of this disclosure. However, in the FIGS. 10 and 11 form the same triangular relationship exists between the swing arms 121 and the leaf spring element 116, namely, the leaf spring 116 extends in a direction at right angles to the pivot axis for the swing arms 121 and at right angles to the pivot pins 132 that connect the swing arms 121 and the associated eyes 130 on the leaf spring element 116. In the FIGS. 10 and 11 form numeral 110 represents the longitudinally extending side rails of a vehicle frame or trailer frame T with the spaced side rails 110 preferably being interconnected by a fixed end rail 111. These side rails 110 are also connected by an adjustable cross member 115 secured by U-bolts 117. Bolted to the underside of the adjustable cross member 115 by shackle elements 119 is a semi-elliptical leaf spring element 116. The leaf spring element 116 is shown as being a single continuous element although it should be noted that separate cantilever half spring elements, similar to those shown in the other forms of this invention, could also be used. In such a case the anchored ends of the cantilever springs would be connected to the cross member 115.

Extending outwardly from and transversely to the side rails 110, and pivotally connected thereto, are the wheel supporting swing arms 121. The swing arms 121 diverge outwardly from the side rails 110 at an angle of approximately 45 degrees in the instance shown, but obviously this angle could be changed to meet varying suspension geometry designs. While the swing arms 121 extend at an angle of approximately 45 degrees to the side rails 110, still, the inner ends of the swing arms 121 are formed so that they may be pivotally connected to pivot pins 125 that extend substantially parallel to side rails 110. Depending ears 122a on mounting bracket 122 journal the pivot pins 125. The brackets 122 are each anchored to the associated side rail 110 by suitable U-bolts 129 to provide the connection between the swing arms 121 and the side rails 110. It will be seen from FIG. 11 that the pivot pins 125 that support the associated swing arms 121 extend parallel to the side rail and perpendicular to the longitudinal direction of leaf spring element 116. It will also be noted from FIGS. 10 and 11 that the pivot pin 132 that connects the eye 130 of the leaf spring element 116 to the outer free end of the swing arm 121 also extends in a direction perpendicular to the longitudinal length of the spring element 116 and parallel to the pivot pin 125 and the associated side rail 110. The outer ends of the swing arms 121 have threaded shaft portions 121a adapted to rotatably mount an appropriate vehicle wheel W.

With this form of the invention it is possible to use a conventional semi-elliptical leaf spring 116 that may be easily mounted on the adjustable cross member 115. The particular curvature of the leaf spring 116 may be selected to meet particular load requirements. In addition, the angle at which the swing arms 121 extend with respect to the horizontal may be varied by adjusting the location of the pivot pin mounting brackets 122 for the swing arms 121. Appropriate eccentric camming means similar to that shown at 81 in FIGS. 1 through 4, may also be used with respect to the shackle bolts 129 of the FIG. 10 and 11 modification, for minor height adjustments.

As with the earlier described forms of this invention, the pivot pins 125 of the swing arms 121 of the FIGS. 10 and 11 form are perpendicular to the leaf spring 116. Therefore, the same principle applies, namely, wheel arm pivot axes are located so that the paths of the spring eye 130 and the wheel arm connection to the spring eye coincide during vertical wheel displacement.

While the suspension disclosed is particularly adapted for use as a two wheel trailer suspension, it is also possible to use this type of suspension in any type of vehicle. Accordingly, this invention is only to be limited by the terms of the claims and not by the specific examples set forth as embodiments of this invention.

I claim:

1. A trailer vehicle comprising a pair of spaced side rails interconnected by a cross member and a suspension therefor comprising a pair of cantilever leaf springs anchored at one end to and diverging outwardly from opposite sides of the vehicle at an angle of approximately forty-five degrees to the longitudinal axis of the vehicle, said leaf springs each having the anchored end thereof extending at an angle across and being fixed to the adjacent side rail and the cross member and a pair of wheel supporting swing arms pivotally mounted on and extending transversely of and outwardly from the opposite side rails of the vehicle, the pivot axis for each of said swing arms substantially intersecting the longitudinal axis of the adjacent leaf spring substantially perpendicular thereto about midway between the free end and anchored portion of the spring, the free end of each leaf spring being pivotally connected to the outer end portion of the adjacent swing arm so that the arcuate path of vertical movement of the swing arm outer end portion coincides substantially with the movement of the free end of the associated leaf spring.

2. A frame supported two wheel vehicle suspension comprising a pair of cantilever leaf springs anchored at one end to the frame and diverging outwardly from opposite sides of the vehicle frame at an angle of approximately forty-five degrees to the longitudinal axis of the frame, each spring being constructed so that the free end deflects under load approximately along an arc whose center is approximately midway between the ends of the spring, and a pair of wheel supporting swing arms pivotally mounted on and extending outwardly from the opposite sides of the vehicle frame substantially perpendicular thereto, the pivot axis of each arm being disposed at an angle of about 45° to the frame and in a plane extending substantially perpendicular to the longitudinal axis of the adjacent leaf spring, the free end of each leaf spring being pivotally connected to the outer end of the adjacent swing arm so that the swing arm and spring define a triangle which is rotatable about the axis of the swing arm pivot.

3. A suspension as defined in claim 2 in which the plane is substantially perpendicular to the longitudinal axis of the adjacent leaf spring substantially at the center of arc of movement of the free end of the spring.

4. A frame supported two-wheel vehicle suspension comprising a frame having frame members, a pair of cantilever leaf springs each anchored at one end to a frame member and diverging outwardly from opposite sides of the vehicle frame at an angle of approximately 45° to the longitudinal axis of the frame, each suspension being constructed so that the free end of each of said springs deflects under load approximately along an arc whose center is approximately midway between the ends of the springs, and a pair of wheels supporting swing arms, each pivotally mounted on and extending outwardly from a frame member substantially perpendicular thereto, the pivot axis of each arm being disposed at an angle of about 45° to the frame member and in a line substantially intersecting the longitudinal axis of the adjacent leaf springs substantially perpendicular thereto, the free end of each leaf spring being pivotally connected to the outer end portion of the adjacent swing arm so that the frame member, swing arm and spring form a triangle rigid in the fore and aft direction, two members of which triangle are rotatable with respect to the frame member.

5. A vehicle suspension including a normally substantially horizontal frame element, a cantilever leaf spring element fixed at one end to the frame element, the spring element being flexible in the vertical direction and substantially inflexible in the fore and aft direction of the vehicle, a substantially rigid swing arm element pivoted at one end to the frame element at a point remote from the fixed end of the spring element and pivoted at its other end to the free end of the spring element, said swing arm pivot at said frame element being on an axis which when extended intersects the spring at a point intermediate its length which point is the effective center of deflection of the free spring end pivot, and said elements forming a triangular frame which is rigid in the fore and aft direction and vertically resilient to permit two elements of the triangle to swing about the frame element under load on the vehicle.

6. A vehicle suspension including a normally substantially horizontal frame element, a cantilever leaf spring element fixed at one end to the frame element and projecting substantially perpendicularly therefrom, the spring element being flexible in the vertical direction and substantially inflexible in the fore and aft direction of the vehicle, a substantially rigid swing arm element pivoted at one end to the frame element at a point remote from the fixed end of the spring element and pivoted at its other end to the free end of the spring element, the swing arm element projecting from the frame element at an angle of about 45°, said swing arm pivot at said frame element being on an axis which when extended intersects the spring at a point intermediate its length which point is the effective center of deflection of the free spring end pivot, and said elements forming a triangular frame which is rigid in the fore and aft direction and vertically resilient to permit two elements of the triangle to swing about the frame element under load on the vehicle.

7. A vehicle suspension including a normally substantially horizontal frame element, a cantilever leaf spring element fixed at one end to the frame element, the spring element being flexible in the vertical direction and substantially inflexible in the fore and aft direction of the vehicle, a substantially rigid swing arm element pivoted at one end to the frame element at a point remote from the fixed end of the spring element on an axis which is perpendicular to the length of the spring element at about the center of the length of the spring element, and pivoted at its other end to the free end of the spring element on an axis substantially perpendicular to the length of the spring element, said elements forming a triangular frame which is rigid in the fore and aft direction and vertically resilient to permit two of the elements to swing about the frame element under load on the vehicle.

8. A frame supported two wheel vehicle suspension comprising a pair of cantilever leaf springs anchored at one end to the frame and diverging outwardly from opposite sides of the vehicle frame at an angle to the longitudinal axis of the frame, each suspension being constructed so that the free end of each of said springs deflects under load approximately along an arc whose center is approximately midway between the ends of the spring, and a pair of wheel supporting swing arms pivotally mounted on and extending outwardly from the opposite sides of the vehicle frame substantially perpendicular thereto, the pivot axis of each arm being disposed at an angle to the frame and in a plane extending substantially perpendicular to the longitudinal axis of the adjacent leaf spring, the free end of each leaf spring being pivotally connected to the outer end portion of the adjacent swing arm so that the swing arm and spring define a triangle which is rotatable about the axis of the swing arm pivot.

References Cited by the Examiner
UNITED STATES PATENTS

| | | | |
|---|---|---|---|
| 1,794,145 | 2/31 | Bussien | 180—43 |
| 1,937,653 | 12/33 | Haltenberger | 180—73 |
| 2,305,936 | 12/42 | Tjaarda | 180—73 |
| 2,708,134 | 5/55 | Sewelin | 267—54 X |
| 2,766,053 | 10/56 | Madruga | 280—414 |

FOREIGN PATENTS

| | | |
|---|---|---|
| 733,617 | 7/32 | France. |
| 865,831 | 3/41 | France. |
| 617,866 | 2/49 | Great Britain. |

A. HARRY LEVY, *Primary Examiner.*

LEO FRIAGLIA, *Examiner.*